Sept. 16, 1952 W. T. NEIMAN 2,610,430
FLY HOLDER
Filed May 22, 1946
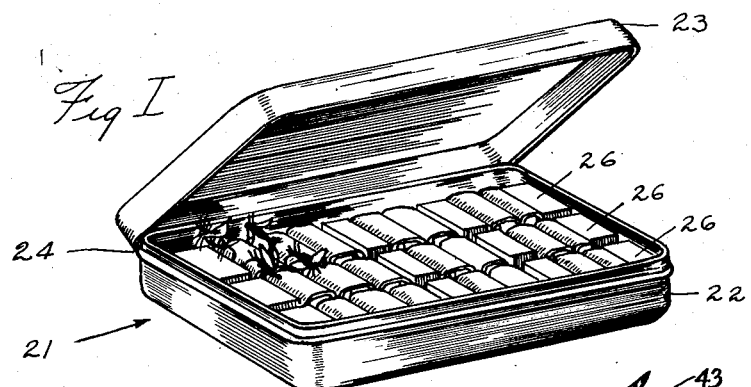
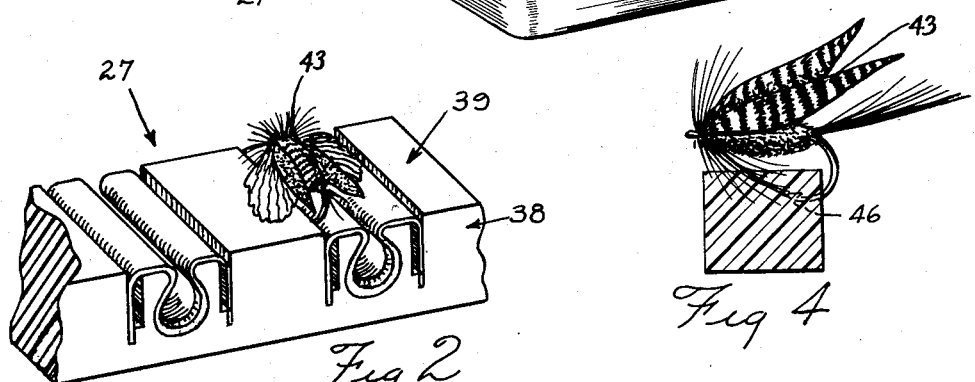
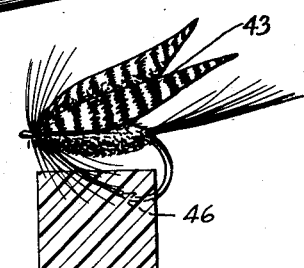
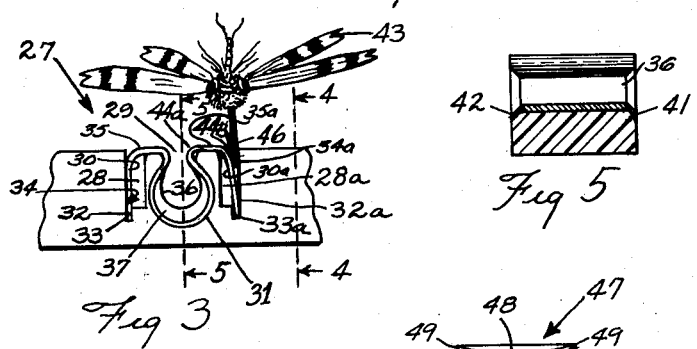
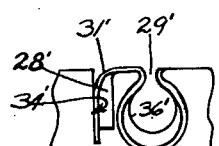
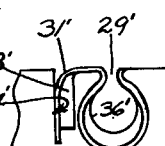
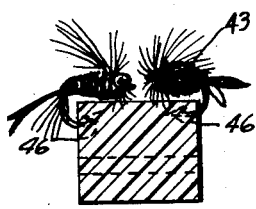
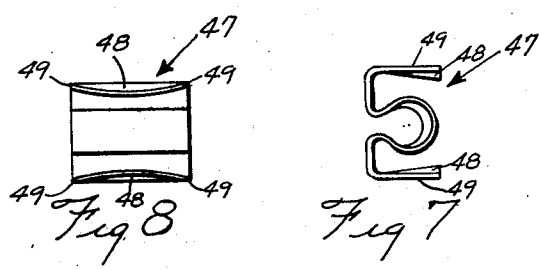
Inventor
William T. Neiman
By McCanna and Morsbach
Attys.

Patented Sept. 16, 1952

2,610,430

UNITED STATES PATENT OFFICE 2,610,430

FLY HOLDER

William T. Neiman, Freeport, Ill.

Application May 22, 1946, Serial No. 671,606

12 Claims. (Cl. 43—57.5)

This invention relates to an improved holder for fish-hooks or artificial flies and the like for a fisherman's kit.

In the sport of fly-fishing, a form of hook called a "fly" is used having feathers and other similar material attached thereto to simulate the appearance of a fly or other insect. These are commonly cast into the water at the end of a fishing line and guided along the surface to lure the fish into striking at the hook which is hidden under the feathers of the fly. Different fish prefer different flies and even the same kind of fish will prefer different flies at different times so that an adequately equipped fisherman will need a large assortment of them. This type of fishing tackle is rather delicate in structure and, therefore, requires a special tackle box to support the fly hook so that none of the delicate features are injured by contact with the sides of the box or with other flies.

In the present state of the art tackle boxes have been provided with fly holders formed of cork or rubber strips, or with pairs of leaf spring members, between which the fly hook may be inserted. With soft constructions, such as cork or rubber, the barb of the hook may catch in the material so as to render it difficult to remove the fly without injury either to the fly or the holder. With a hard construction such as a metallic spring material on each side of the hook the fly is not gripped positively enough since it will usually be held at some one high point and be more or less pivoted about that point.

In my improved holder, one of the important features is the provision of a hook-gripping member on one or both sides of the hook which is slightly softer than the ordinary metallic hook so as to be limitedly indentable when a hook is pressed resiliently against it by a suitable spring member. I avoid the extreme softness of cork and rubber-like materials and also avoid the condition where both surfaces gripping the hook are metallic members and, therefore, not readily indentable. By using synthetic resinous materials or the like, as one of the members pressed against the fly hook, I have found that such materials will be indented slightly to hold the fly firmly yet in such a manner that it can be readily removed and replaced a great many times without injury to the fly or to the holder.

Another important object of the invention is to provide a low cost and compact construction of the character indicated above which can be suitably made from a variety of inexpensive materials.

Thus, one of the important objects of my invention, involving a new principle in the art of holding flies, is to provide a structure in which a limitedly indentable material is provided for a fly hook to be pressed and held firmly thereagainst.

Other objects and advantages will be apparent from the following description and the accompanying drawing, in which—

Figure 1 is a perspective view of a fly box employing one modification of the present invention and is shown in the open position with four flies in place;

Fig. 2 is an enlarged fragmentary perspective view of one of the fly-supporting racks shown in Figure 1;

Fig. 3 is an enlarged side view of one of the fly-holding units shown in Figures 1 and 2;

Fig. 4 is a sectional view of Fig. 3 taken on the line 4—4;

Fig. 5 is a sectional view of Fig. 3 taken on the line 5—5;

Fig. 6 is a modification of the fly-holding unit shown in the previous figures;

Figs. 7 and 8 are end and bottom views, respectively, of a modified form of spring especially adapted to holding a pair of flies in a single groove, and Fig. 9 is a sectional view, similar to Fig. 4, of a modified fly holder employing the Figs. 7 and 8 spring to hold a pair of flies in each groove.

Referring to the drawing, the numeral 21 indicates a fly box comprising a lower section 22 and an upper section or lid 23 hingedly connected together at 24. Numerals 26 indicate fly supporting racks or bars mounted in the box. Along each bar are a number of fly-holding units, a preferred form of which is shown enlarged in Figs. 2 and 3 and each adapted to hold two or four flies. These units, each generally designated 27, comprise a pair of spaced parallel, identical, hook-receiving slots 28 and 28a having the mounting or supporting slot 29 therebetween. A spring member 31 made of flat spring strip or ribbon material, such as beryllium copper, will be provided having its ends 32 and 32a received within the narrow slots 33 and 33a formed as a continuation of the outer hook-receiving slot walls 34 and 34a remote from the mounting slot 29 to secure the ends of the spring in a preselected fixed position adjacent the bottom of the slots 28 and 28a. The spring member has an intermediate portion 36 expanded into a loop or otherwise formed for engagement with the enlarged interior or bottom portion 37 of the mounting slot to hold the spring in place and portions 30 and 30a movable between positions in which they abut against the side walls 34 and 34a respectively and a position in which they are spaced from the walls and together with the walls 34 and 34a define opposed jaws for gripping a fish hook or the like inserted therebetween. As shown the portions 30 and 30a are interconnected with the intermediate portion 36 by bridging portions 35 and 35a, respectively. The intermediate portion 36 and the bridging portions 35 and 35a in effect define mounting portions for the resilient jaws 30 and 30a. For convenience in assembling the spring all three slots 28, 28a and 29 will extend through at least one of the bar side surfaces 38 in addition to the top surface 39 and, as shown in Fig. 5, the spring will be flared out at 41 and 42 to be received in the flared end portions of the mounting slot 29 after assembly to keep it from working its way out through one of the sides. The width of the slots 28 and 28a and the slot 29 at the top surface 39 will be sufficiently wide so that when a fly 43 is disposed on the rack, as shown in Fig. 3, the top corner portions 44a and 44b of the spring will be displaced simultaneously in equal amounts to the left. By providing a substantial, looped, intermediate portion of the spring within the enlarged portion 37 of the mounting slot in this manner, a highly desirable resiliency is imparted to the spring action. Furthermore, while it is not necessary in all cases, the mounting of the spring ends in the reduced slots 33 and 33a adjacent the remote walls 34 and 34a is preferable for the purpose of increasing the pressure of the hook 46 against the plastic wall, thereby improving the tendency of the hook to be imbedded in the plastic wall material.

The hook-holding modification shown in Fig. 6 is substantially the same as that already described for the previous modification, except that it has only one fly-holding slot instead of two, the construction and use otherwise being the same. It will be seen that the Fig. 6 modification would be identical to the Fig. 3 modification if the hook-receiving slot 28a and associated parts were omitted in Fig. 3.

Figs. 7 and 8 illustrate a modification of the invention showing how the spring member may be formed to most effectively engage one fly at each end of each slot. In this case, the spring, generally designated 47, is shown before it is inserted into the notched bar 26 and hence before the ends are flared out as have been indicated at 41 and 42. The main point of distinction between spring 47 and the spring 31 shown in Figs. 2, 3 and 5 is that the end portions 48 are initially formed with an exteriorly concave configuration. Thus, when assembled in a notched bar similar to that shown in Figs. 2 and 3, this concavity is flattened substantially, resulting in a high stress concentration at the outer edges 49. These edges will then be operative to very tightly and independently grip a pair of flies in each slot, as shown in Fig. 9.

The material of the bar or rack 26, and hence the material of the surfaces 34 and 34a against which the hook is pressed by the spring member 31 or 47, is an important part of my invention and constitutes a material slightly softer than the hook 46 so as to be limitedly indentable and therefore frictionally engageable by the latter but preferably not anywhere near as soft as cork or rubber which has been employed in certain conventional fly holders. A large class of materials is available for this use, preferred materials being synthetic resinous materials, including both the thermoplastic and thermosetting types of plastics materials. While both of these types of plastics materials perform advantageously in this type of service, I have found that the thermoplastic materials are best since, in general, they are slightly softer and hence more readily indentable. Certain grades of wood, soft metal combinations, and fiber materials may be employed to advantage in some cases. In certain cases I have also found it advantageous to apply a coating of suitable synthetic resin to the spring member 31 or 47.

While particular forms of the present invention have been shown, it will be apparent that minor changes therein will readily suggest themselves to others skilled in the art without departing from the spirit and scope of the invention. Having thus described the invention, what is claimed as new is:

1. A holder for fish-hooks or the like comprising a bar having a pair of spaced parallel slots formed therein, a resilient spring strip having spaced parallel edges, said strips having its ends mounted in said slots and resiliently pressed against the outer surfaces of said slots, the end portions of said springs trip being formed with an outwardly directed concavity therein whereby when they are assembled within said slots the spaced parallel edges of said strip are pressed against said outer surfaces with a substantially greater force than the center of said strip, in such a manner that each of said spaced parallel edges is adapted to grip a fish-hook or the like between itself and the adjacent outer slot surface, and means intermediate said slots for mounting said strip in the bar.

2. A holder for a fish-hook or the like comprising a bar of indentable polymerized resinous material, having formed therein a pair of hook-receiving slots and a mounting slot therebetween, and a spring member of resilient flat strip material having its ends engaged respectively by said bar within said hook-receiving slots and having an intermediate portion mounted within said mounting slot, said spring being pressed into flatwise abutment wtih the wall in each of said hook-receiving slots remote from said mounting slot, the open tops of said slots adjacent the surface of said bar being of sufficient width to permit simultaneous displacement of portions of said spring across the top of said mounting slot and the top of one of said hook-receiving slots when a hook is inserted within the latter slot to displace said spring from said remote wall therein.

3. A holder for a fish-hook or the like comprising a bar having formed in a top surface thereof a pair of spaced, parallel, hook-receiving slots with an interiorly-enlarged mounting slot therebetween, and a spring member made of flat, resilient, spring strip material having its ends engaged respectively within said hook-receiving slots and having an intermediate portion thereof extending into said mounting slot, said intermediate spring portion within said mounting slot being formed to engage the interiorly-enlarged portion thereof to restrain movement of said spring with respect to said bar, the ends of said slots opening in opposite side surfaces of said bar to facilitate assembly of said spring, each of said spring end portions being engaged in resilient flatwise abutment with the wall of one of said hook-receiving slots remote from said mounting slot and adapted to be pressed away from said remote wall by the insertion of a fish-hook or the like between said remote wall and said spring.

4. A holder for fish-hooks and the like of the type in which a fish hook is pushed into the holder for storage and pulled therefrom for use, comprising a bar of synthetic resinous material having at least one pair of spaced parallel slots formed therein, a resilient spring member having opposite ends disposed in said slots, said ends being movable between a position in which the ends are in a substantially contiguous relation with the outer side walls of the respective slots and a position in which a part of the ends adjacent the top of the slots are spaced from said outer side walls, said outer side walls and said ends defining jaws for receiving a fish-hook therebetween, and means for mounting each spring strip to resiliently urge said end portions toward engagement with the respective outer side walls to positively secure the fish-hook disposed between said jaws.

5. A holder for a fish-hook or the like, comprising a bar of synthetic resinous material having hook receiving and mounting slots formed therein, said hook receiving slot having one substantially smooth side wall and said mounting slot having the upper portions of its side walls overhanging the extreme sides of the mounting slot, a spring member having a first portion adjacent said side wall in the hook receiving slot, a second portion disposed in the mounting slot and a third portion interconnecting the first and second portions, said first portion being movable between a position in which it is in substantially contiguous relation with said one side wall and a position in which it is spaced from said one side wall, said second portion being disposed in said mounting slot and expansible to engage substantially the entire side wall defining the mounting slot, said third portion being movable between preselected positions in unison with movement of said first portion and together with said second portion defining a resilient mounting for the first portion urging the latter toward engagement with said one side wall, said first portion and said one side wall defining jaws, one of which is urged toward the other for frictionally grippingly engaging a fish-hook inserted therebetween and positively securing it in position.

6. The combination recited in claim 5 in which the synthetic resinous material is limitedly deformable and the extreme end of the first portion is fixedly secured at the bottom of the slot adjacent said one side wall to maintain said first portion in contiguous relation with said one side wall of the slot in one position of the first portion and to cause said first portion to be stressed to exert a force, to cause said hook to limitedly deform said side wall when the first portion is in its other position and the hook is disposed between said jaws.

7. The combination recited in claim 5 in which opposite ends of the mounting slot are flared outwardly and the ends of the second portion of the spring member are flared outwardly into engagement with said flared portions of the second slot to prevent endwise displacement of the spring with respect to the slot.

8. A holder for fish hooks or the like, comprising a bar of limitedly deformable material having a plurality of pairs of spaced, parallel slots formed therein, the outwardly disposed walls of each pair of slots defining first surfaces, each pair of slots having a resilient spring strip of material with its ends received respectively in each slot and resiliently pressed in flatwise abutment with said first surfaces respectively to define therewith opposed jaws normally biased together and separable by pushing a fish hook edgewise therebetween, and means associated with each pair of slots for mounting said spring strip in the above described position.

9. A holder for a fish-hook or the like as recited in claim 2 in combination with means formed in said bar for fixedly securing the extreme ends of said spring in said hook receiving slots adjacent the walls of said hook receiving slots remote from the mounting slot to urge said spring in the direction of said remote walls whereby the pressure of said spring acting against a hook received between the remote walls and the spring is effective to maintain said hook in place.

10. A holder for fish-hooks and the like of the type in which a hook is pushed edgewise into the holder for storage and pulled therefrom for use, comprising a synthetic resinous member having a limitedly deformable first surface of substantial width, a resilient spring member having a mounting portion and a resilient portion, said resinous member having a slot for mounting said mounting portion to normally position said resilient portion adjacent the first surface to define therewith opposed jaws, said jaws being separable upon pushing a fish-hook edgewise therebetween and said resilient portion of the spring member being normally biased toward said first surface on the synthetic resinous member, the portion of said jaws defined by said first surface being limitedly deformed when a fish-hook is disposed between said jaws whereby said hook is grippingly engaged and positively secured in position, and said resilient portion of the spring member being shaped to define spaced jaw portions bearing against said first surface at spaced positions with a higher pressure than the portion of the resilient spring portion intermediate said jaw portions thereon to define with said first surface spaced pairs of opposed jaws each adapted to independently grip a fish-hook pushed edgewise therebetween.

11. A holder for fish-hooks and the like of the type in which a hook is pushed edgewise into the holder for storage and pulled therefrom for use, comprising a first member formed with a slot at least one wall of which is defined by a limitedly deformable synthetic resinous material, and a resilient spring member mounted on said first member and formed with a resilient portion disposed in said slot and resiliently biased to abut against said one wall of the slot to define therewith opposed jaws for resiliently gripping a hook inserted therebetween.

12. The device of claim 11 wherein said slot at its top is formed by a second wall spaced from said one wall a distance permitting movement of said resilient spring portion disposed within the slot away from said one wall of the slot upon insertion of a hook between said jaws.

WILLIAM T. NEIMAN.

REFERENCES CITED

The following references are of record in the file of this patent:

UNITED STATES PATENTS

| Number | Name | Date |
|---|---|---|
| 316,062 | Riessner | Apr. 21, 1885 |
| 429,578 | Neidringhaus | June 3, 1890 |
| 577,350 | Bower | Feb. 16, 1897 |
| 1,448,338 | Drew | Mar. 13, 1923 |
| 1,813,686 | Stetson | July 7, 1931 |
| 1,815,568 | Jacqmein | July 21, 1931 |
| 2,065,234 | Martinez | Dec. 22, 1936 |
| 2,143,119 | Warring | Jan. 10, 1939 |
| 2,188,987 | Strom | Feb. 6, 1940 |
| 2,209,953 | Youngquist | Aug. 6, 1940 |
| 2,238,380 | Almen | Apr. 15, 1941 |
| 2,409,180 | Annett et al. | Oct. 15, 1946 |
| 2,430,624 | Vollmer | Nov. 11, 1947 |

FOREIGN PATENTS

| Number | Country | Date |
|---|---|---|
| 442,588 | Great Britain | Feb. 10, 1936 |